United States Patent
Harting et al.

(10) Patent No.: US 6,766,867 B1
(45) Date of Patent: Jul. 27, 2004

(54) HITCH ASSEMBLY WITH SWAY BLOCK SUPPORT

(75) Inventors: Michael Carl Harting, La Porte City, IA (US); Michael Dean Kollath, La Porte City, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/424,318

(22) Filed: Apr. 28, 2003

(51) Int. Cl.$^7$ .............................................. A01B 59/00
(52) U.S. Cl. ...................................... 172/450; 172/439
(58) Field of Search .................................. 172/430, 448, 172/439, 440, 450, 443, 482, 491, 580, 441, 442, 445, 449, 97; 280/460.1, 461.1

(56) References Cited

U.S. PATENT DOCUMENTS

| | | | | |
|---|---|---|---|---|
| 2,506,773 A | * | 5/1950 | Bunting | 280/448 |
| 3,677,565 A | * | 7/1972 | Slosiarek | 280/499 |
| 4,216,975 A | | 8/1980 | Schafer | 280/461 |
| 4,397,359 A | | 8/1983 | Price et al. | 172/430 |
| 5,201,539 A | | 4/1993 | Mayfield | 280/479.2 |
| 5,697,454 A | * | 12/1997 | Wilcox et al. | 172/447 |
| 5,971,082 A | * | 10/1999 | Satzler | 172/439 |
| 6,223,841 B1 | * | 5/2001 | Susag et al. | 180/53.4 |

OTHER PUBLICATIONS

John Deere, "Operator's Manual 4650 and 4850 Tractors"; pp. 50–6 & 50–7, 1985.
John Deere, "Operator's Manual 7600, 7700, and 7800 Tractors", pp. 50–10, 50–11 & 50–16, 1992.
John Deere, "Hitch Assembly—7010 Series Tractor", date unknown.
Case IH, MX200—jpg 3 images, date unknown.

\* cited by examiner

*Primary Examiner*—Robert E. Pezzuto

(57) ABSTRACT

A hitch assembly is mounted on a frame of an agricultural tractor. The hitch assembly includes a pair of draft links pivotally mounted on the frame, a drawbar support fixed to the frame between the draft links, and a pair of sway blocks fixed to opposite sides of the frame. Each sway block has an upper end fixed to a side of the frame and extends generally downwardly to a lower free end. The lower free end of each sway block is positioned below a plane defined by a bottom surface of the drawbar support. Each sway block is preferably tapered from a wider front side to a narrower rear side to form an inner surface which faces inwardly and rearwardly. A wedge plate is mounted beneath the drawbar support. The plate extends generally laterally from a left end surface to a right end surface, and each end surface is slanted in order to matingly engage the inner surface of a corresponding one of the sway blocks. The wedge plate is longer than the drawbar support, and projects laterally out from the left and right ends of the drawbar support. As a result, the wedge plate end surfaces engage the inner surfaces of the corresponding inner sway blocks and supports them against side forces applied by the draft links.

12 Claims, 5 Drawing Sheets

HITCH ASSEMBLY WITH SWAY BLOCK SUPPORT

BACKGROUND

The present invention relates to a hitch assembly for an agricultural tractor.

Current production agricultural tractors have implement hitches which have pivotal draft links for coupling to an implement or to a quick coupler. Such draft links are subject to side loads and will swing laterally when the tractor turns while an attached implement is still in the ground. U.S. Pat. No. 4,216,975, issued Aug. 12 1980 describes a tractor hitch assembly with left and right sway links which can be positioned to lock or to permit lateral sway of the draft links. It is also known to use frame-mounted sway blocks to limit lateral motion of the hitch draft links. It is also known to taper conventional sway blocks in the vertical direction to permit maximum sway when the hitch is lowered and to permit no sway when the hitch is in a raised transport position. However, as the tires used on agricultural tractors become larger, the draft links have to be lower relative to the frame of the tractor to maintain the required height off of the ground. If, to limit lateral motion of the hitch, the sway blocks are extended down below the tractor frame, hitch side loads can then damage the unsupported lower portion of such sway blocks. It would be desirable to have a hitch assembly for such tractors with large tires wherein the sway blocks are protected from damage by side forces on the hitch links.

SUMMARY

Accordingly, an object of this invention is to provide a hitch assembly for tractors with large tires.

A further object of the invention is to provide such a hitch assembly sway blocks which will limit and not be damaged by lateral motion of the hitch.

These and other objects are achieved by the present invention, wherein a hitch assembly is mounted on a frame of an agricultural tractor. The hitch assembly includes a pair of draft links pivotally mounted on the frame, a drawbar support fixed to the frame between the draft links, and a pair of sway blocks fixed to opposite sides of the frame. Each sway block has an upper end fixed to a side of the frame and extends generally downwardly to a lower free end. The lower free end of each sway block is positioned below a plane defined by a bottom surface of the drawbar support. Each sway block is preferably tapered from a wider front side to a narrower rear side to form an inner surface which faces inwardly and rearwardly. A wedge plate is mounted beneath the drawbar support. The plate extends generally laterally from a left end surface to a right end surface, and each end surface is slanted in order to matingly engage the inner surface of a corresponding one of the sway blocks. The wedge plate is longer than the drawbar support, and projects laterally out from the left and right ends of the drawbar support. As a result, the wedge plate end surfaces engage the inner surfaces of the corresponding inner sway blocks and supports them against side forces applied by the draft links.

DETAILED DESCRIPTION

Figure 1:
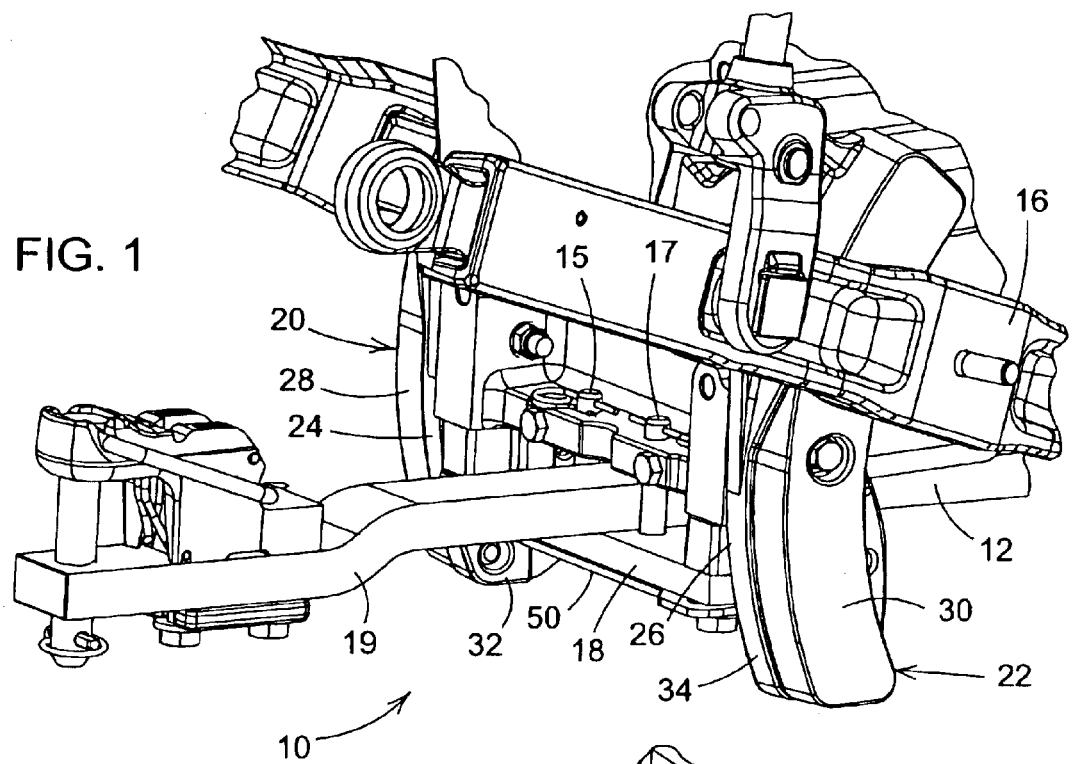
FIG. 1 is a perspective view from above and from the side of a hitch assembly according to the present invention.
Figure 2:
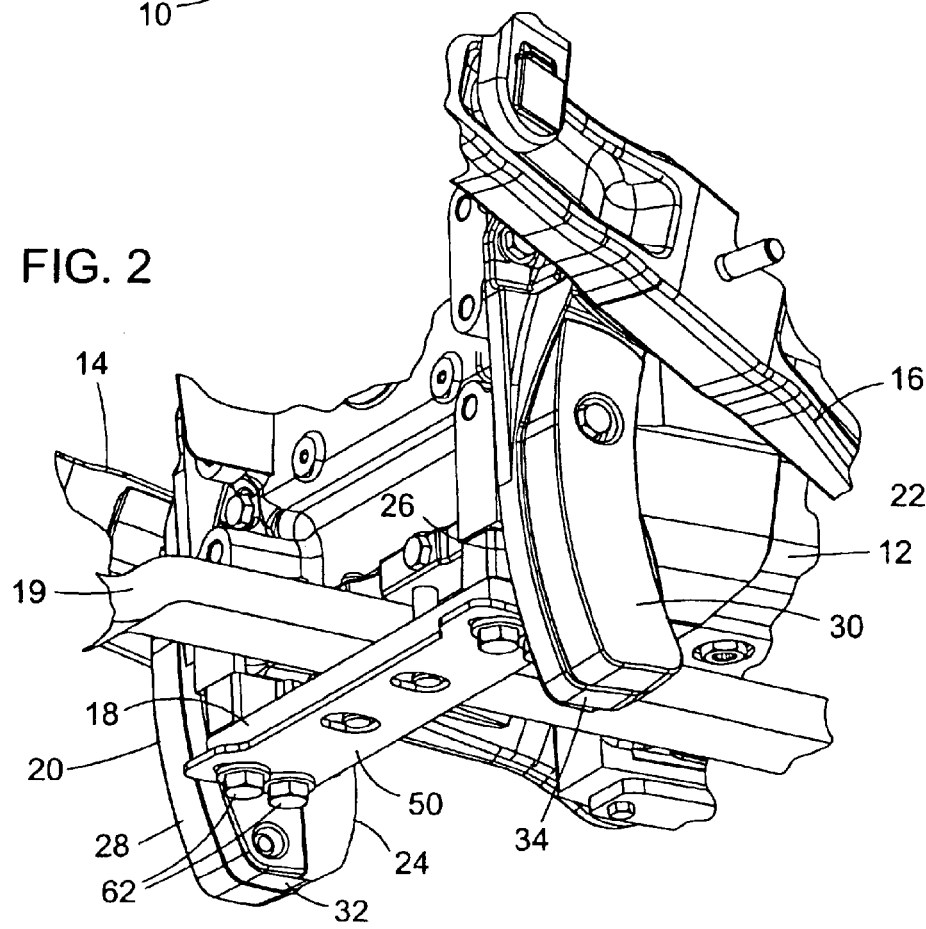
FIG. 2 is a perspective view from below and from the side of a hitch assembly according to the present invention.

Referring to FIGS. 1 and 2, a hitch assembly 10 is mounted on a frame 12 of an agricultural tractor. The hitch assembly 10 includes a pair of draft links 14, 16 pivotally mounted on the frame 12 in a conventional manner. A conventional drawbar support 18 is fixed to the frame 12, extends laterally between the draft links 14, 16 and supports a conventional drawbar 19 and drawbar retaining pins 15 and 17. A pair of sway blocks 20, 22 are fixed to opposite sides of the frame. Each sway block includes an inner member 24, 26 and an outer member 28, 30 which is attached to an outer surface of a lower portion of the corresponding inner member 24, 26. Each inner member 24, 26 has an upper end fixed to a side of the frame 12 and extends generally downwardly to a lower free end 32, 34.

Figure 3:
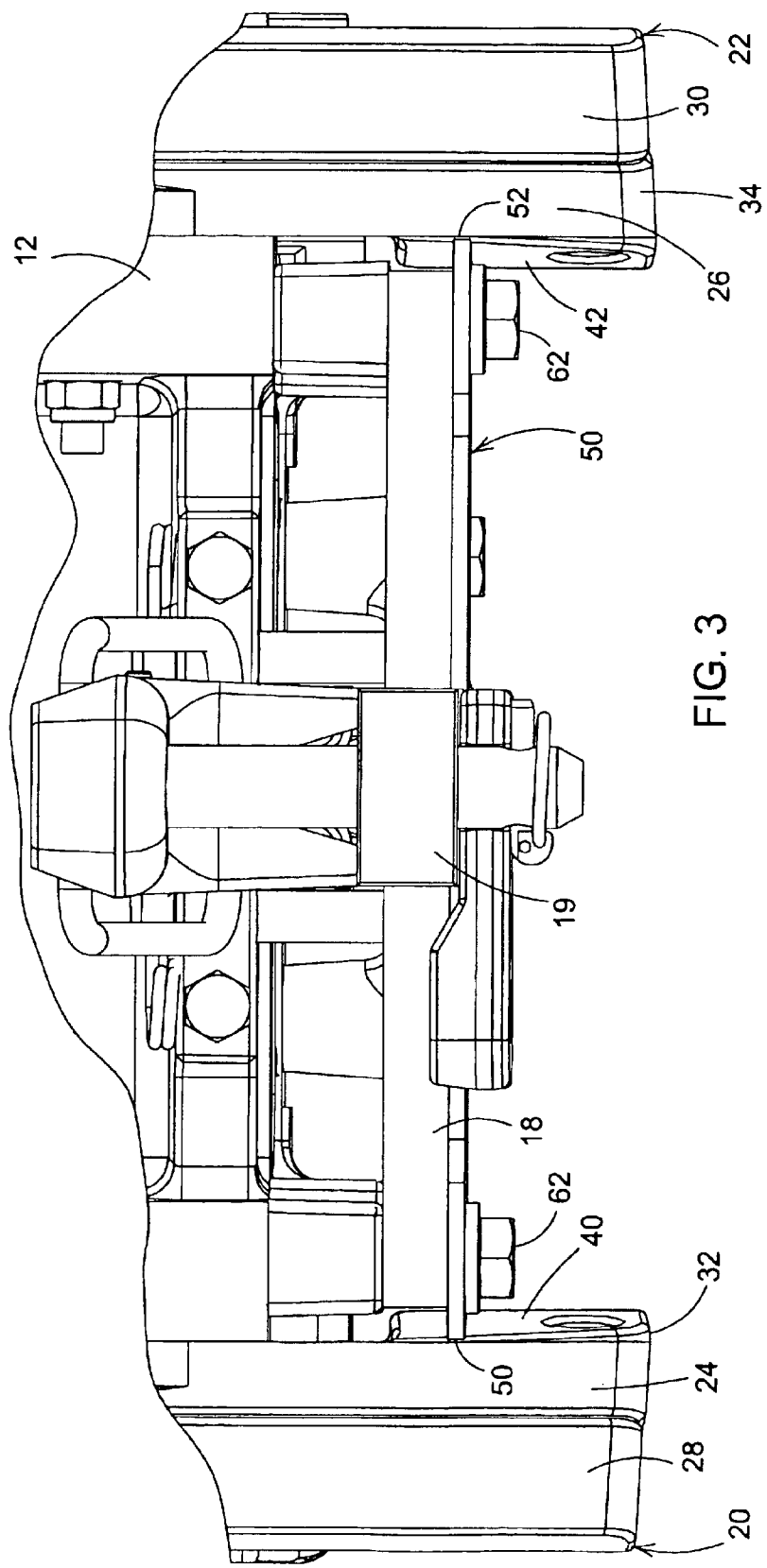
FIG. 3 is a view from directly behind a hitch assembly according to the present invention.

As best seen in FIG. 3, each inner member 24, 26 has a slanted inner surface 40, 42 formed by a narrower rear end and a wider forward portion, so that surfaces 40, 42 face generally inwardly and partially rearwardly.

Figure 4:
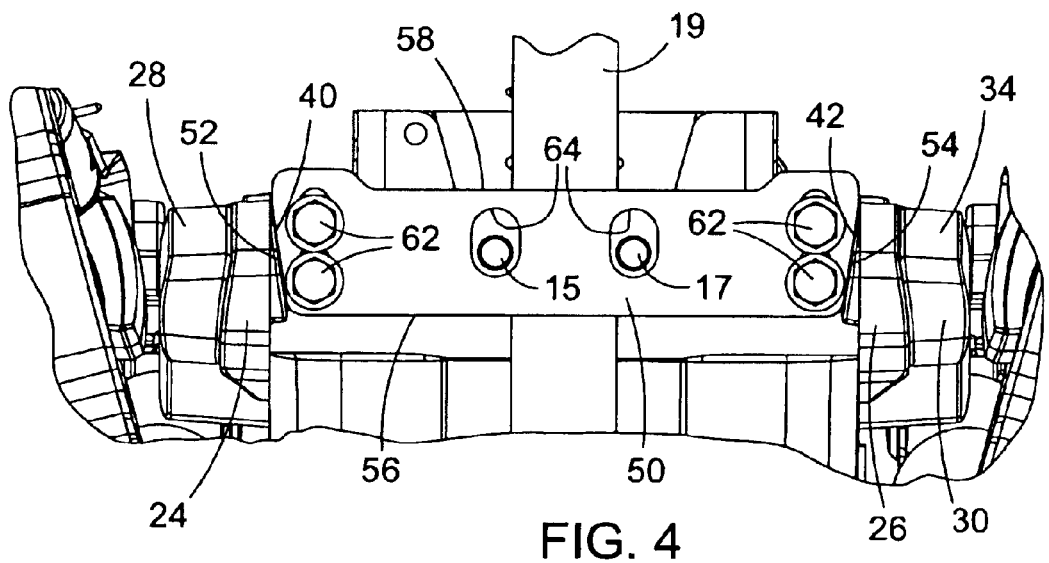
FIG. 4 is a view from directly below a hitch assembly according to the present invention.

As best seen in FIGS. 2, 3 and 4, a wedge plate 50 is attached to and mounted beneath the drawbar support 18. Plate 50 extends generally laterally from a left end surface 52 to a right end surface 54. The wedge plate 50 has a shorter forward side 56 and a longer rearward side 58, so that end surfaces 52, 54 are slanted in order to matingly engage the inner surfaces 40, 42 of the corresponding inner member 24, 30. A set of elongated mounting slots 60 are formed near the ends of plate 50, and the plate 50 is attached to the bottom of drawbar support 18 by bolts 62 which extend through slots 60 so that the position of plate 50 can be adjusted relative to drawbar support 18. A pair of elongated slots 64 are spaced apart in a central portion of plate 50 so as to accommodate and allow plate 50 to be moved relative to drawbar retaining pins 15, 17.

Figure 5:
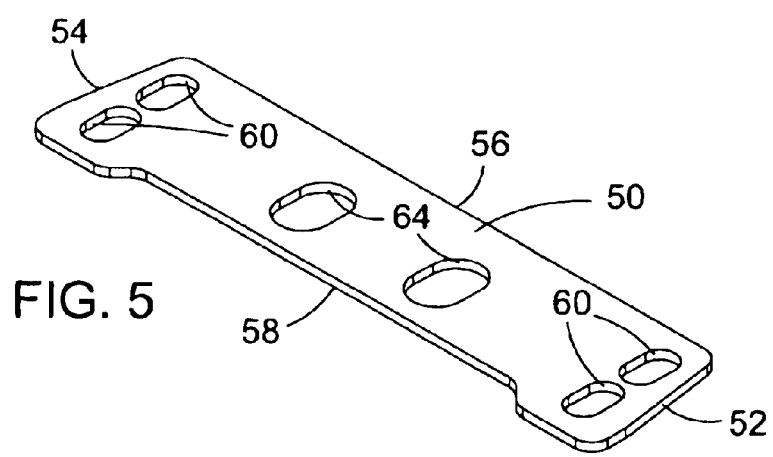
FIG. 5 is a perspective view of the wedge plate of FIG. 1.

As best seen in FIG. 5, the lower free end of each sway block 20, 22 is positioned below a plane defined by a bottom surface of the drawbar support 18. The wedge plate 50 is longer than the drawbar support 18, and projects laterally out from the left and right ends of the drawbar support 18. As a result, the wedge plate 50 end surfaces 52, 54 engage the inner surfaces 40, 42 of the corresponding inner member 24, 26 and support the lower portions of the sway blocks 20, 22 against side forces applied by the draft links 14, 16.

The ends 52, 54 of the plate 50 are preferably angled so that the side loads transmitted from the sway blocks 20, 22 cannot overcome the clamping forces provided by bolts 62. The plate 50 can be used with a variety of drawbar support and drawbar vertical spacer combinations. The vertical length of the tapered portion of the sway blocks 20, 22 can be adjusted to match the height of the plate 50 with any available drawbar support option.

Figure 6:
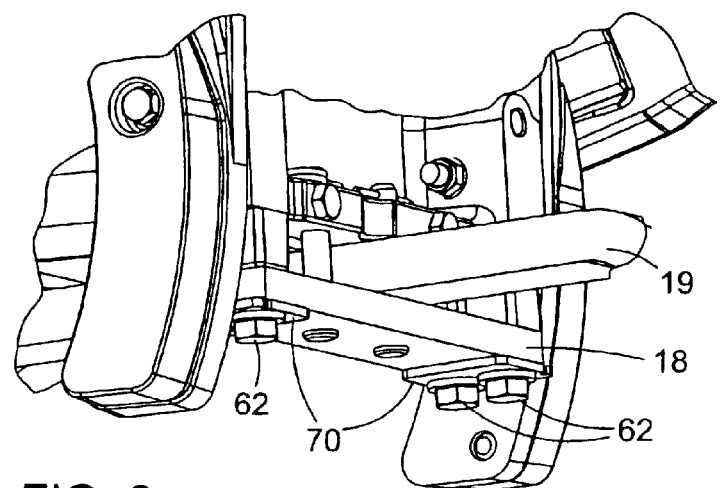
FIG. 6 is a perspective view of an alternate embodiment of the present invention.
Figure 7:
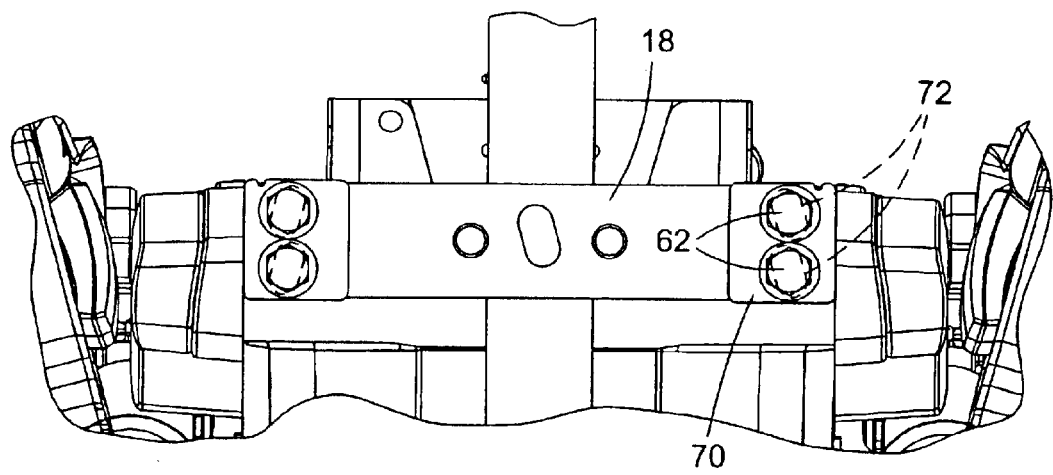
FIG. 7 is a view from directly below a portion of the hitch assembly of FIG. 5
Figure 8:
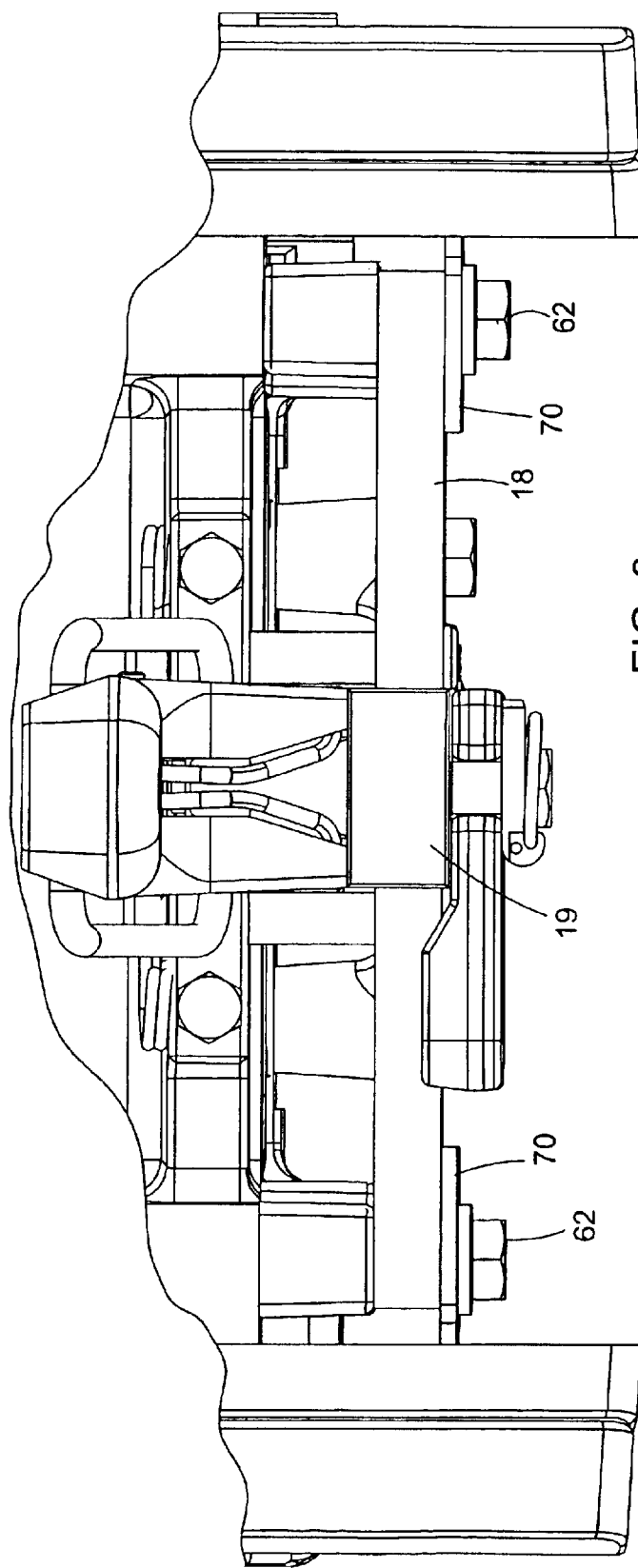
FIG. 8 is a view from directly behind a hitch assembly of FIG. 5.

Referring now to FIGS. 6–8, instead of a single plate extending laterally across the entire width on the drawbar support 18, a pair of spaced apart plates 70 are attached to opposite ends of the drawbar support 18. Each plate 70 has a pair of oblong slots 72 which receive the attaching bolts 62, so that each plate 70 can be adjusted relative to drawbar support 18.

As best seen in FIG. 8, each plate 70 projects laterally out from the left and right ends of the drawbar support 18. As a result, each plate 70 engages the inner surfaces 40, 42 of the corresponding inner member 24, 26 and support the lower portions of the sway blocks 20, 22 against side forces applied by the draft links 14, 16.

the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A hitch assembly mounted on a frame of an agricultural tractor, the hitch assembly comprising:

a pair of draft links pivotally mounted on the frame;

a drawbar support fixed to the frame between the draft links;

a pair of sway blocks fixed to opposite sides of the frame, each sway block having an upper end fixed to a side of the frame and extending generally downwardly to a lower free end; and a wedge plate attached to and mounted beneath the drawbar support, the plate extending generally laterally from a left end surface to a right end surface, each end surface matingly engaging an inner surface of a corresponding one of the sway blocks.

2. The hitch assembly of claim 1, wherein:

each sway block is tapered from a wider front side to a narrower rear side to form an inner surface which faces inwardly and rearwardly; and each end surface of the wedge plate is slanted in order to matingly engage the inner surface of a corresponding one of the sway blocks.

3. The hitch assembly of claim 1, wherein:

the wedge plate is movably mounted to the drawbar support.

4. The hitch assembly of claim 1, wherein:

the wedge plate has a forward side and a rearward side, the rearward side being longer than the forward side in a lateral direction.

5. The hitch assembly of claim 1, wherein:

the lower free end of each sway block is positioned below a plane defined by a bottom surface of the drawbar support.

6. The hitch assembly of claim 1, wherein:

the wedge plate has a plurality of slots formed therein, and the wedge plate being attached to the drawbar supports by bolts which extend through the slots.

7. The hitch assembly of claim 1, wherein:

each sway block includes an inner member and an outer member which is attached to an outer surface of a lower portion of the corresponding inner member.

8. A hitch assembly mounted on a frame of an agricultural tractor, the hitch assembly comprising:

a pair of draft links pivotally mounted on the frame;

a drawbar support fixed to the frame between the draft links;

a pair of sway blocks fixed to opposite sides of the frame, each sway block having an upper end fixed to a side of the frame and extending generally downwardly to a lower free end, each sway block being tapered from a wider front side to a narrower rear side to form an inner surface which faces inwardly and rearwardly; and a wedge plate mounted beneath the drawbar support, the plate extending generally laterally from a left end surface to a right end surface, each end surface being slanted in order to matingly engage the inner surface of a corresponding one of the sway blocks.

9. A hitch assembly mounted on a frame of an agricultural tractor, the hitch assembly comprising:

a pair of draft links pivotally mounted on the frame;

a drawbar support fixed to the frame between the draft links;

a pair of sway blocks fixed to opposite sides of the frame, each sway block having an upper end fixed to a side of the frame and extending generally downwardly to a lower free end; and a pair of wedge plates attached to and mounted beneath the drawbar support, the plates being spaced apart and attached to opposite ends of the drawbar support, each plate having an end surface which matingly engages an inner surface of a corresponding one of the sway blocks.

10. The hitch assembly of claim 9, wherein:

each wedge plate is movably mounted to the drawbar support.

11. A hitch assembly mounted on a frame of an agricultural tractor, the hitch assembly comprising:

a pair of draft links pivotally mounted on the frame;

a drawbar support fixed to the frame between the draft links;

a pair of sway blocks fixed to opposite sides of the frame, each sway block having an upper end fixed to a side of the frame and extending generally downwardly to a lower free end, each sway block being tapered from a wider front side to a narrower rear side to form an inner surface which faces inwardly and rearwardly; and a pair of wedge plates mounted beneath the drawbar support at opposite ends of the drawbar support, each wedge plate having an outer surface which matingly engages the inner surface of a corresponding one of the sway blocks.

12. The hitch assembly of claim 11, wherein:

each wedge plate has a pair of slots which are angled with respect to a fore-and-aft axis of the tractor, and the wedge plates are attached to the drawbar supports by bolts which extend through the angled slots.

* * * * *